(12) United States Patent
Mizuno et al.

(10) Patent No.: US 8,253,775 B2
(45) Date of Patent: Aug. 28, 2012

(54) MULTIPOINT CONFERENCE SYSTEM, MULTIPOINT CONFERENCE METHOD, AND PROGRAM

(75) Inventors: Daisuke Mizuno, Tokyo (JP); Hiroaki Dei, Tokyo (JP); Kazunori Ozawa, Tokyo (JP)

(73) Assignee: NEC Corporation, Tokyo (JP)

( * ) Notice: Subject to any disclaimer, the term of this patent is extended or adjusted under 35 U.S.C. 154(b) by 1265 days.

(21) Appl. No.: 11/993,934

(22) PCT Filed: Jun. 8, 2006

(86) PCT No.: PCT/JP2006/311549
§ 371 (c)(1),
(2), (4) Date: Dec. 26, 2007

(87) PCT Pub. No.: WO2007/007496
PCT Pub. Date: Jan. 18, 2007

(65) Prior Publication Data
US 2009/0207232 A1      Aug. 20, 2009

(30) Foreign Application Priority Data
Jul. 12, 2005   (JP) ................................ 2005-202965

(51) Int. Cl.
*H04R 7/14*            (2006.01)
(52) U.S. Cl. .................................. 348/14.09; 348/14.11
(58) Field of Classification Search ..... 348/14.01–14.16; 370/260–270; 379/201.01, 202.01
See application file for complete search history.

(56) References Cited

U.S. PATENT DOCUMENTS

| | | | | |
|---|---|---|---|---|
| 5,914,940 | A | * | 6/1999 | Fukuoka et al. ............... 370/263 |
| 2002/0126626 | A1 | * | 9/2002 | Singh et al. ................... 370/260 |

FOREIGN PATENT DOCUMENTS

| | | | |
|---|---|---|---|
| JP | 61263385 | A | 11/1986 |
| JP | 02125588 | A | 5/1990 |
| JP | 05328344 | A | 12/1993 |
| JP | 07023391 | A | 1/1995 |
| JP | 07046198 | A | 2/1995 |
| JP | 07095300 | A | 4/1995 |
| JP | 07264580 | A | 10/1995 |
| JP | 07298257 | A | 11/1995 |
| JP | 08065687 | A | 3/1996 |
| JP | 08107553 | A | 4/1996 |
| JP | 08163558 | A | 6/1996 |
| JP | 09247686 | A | 9/1997 |
| JP | 10164539 | A | 6/1998 |
| JP | 10505996 | A | 6/1998 |
| JP | 2000078552 | A | 3/2000 |

(Continued)

OTHER PUBLICATIONS

PCT/JP2006/311549, International Search Report, mailed Sep. 7, 2006.

(Continued)

*Primary Examiner* — Brian Ensey

(57) ABSTRACT

A multipoint videoconference server is made to swiftly respond to a video switching request from a terminal and a degree of computational complexity is made lower. A server 300 decodes only m ($1 < m \leq n$) video streams selected from n terminals and stores video streams that need not be decoded in buffers. When an instruction to switch to another stream is received from a terminal, the server 300 uses data accumulated in the buffers and decodes from the latest I frame by going back to the past before starting to provide a video using the video stream.

13 Claims, 5 Drawing Sheets

FOREIGN PATENT DOCUMENTS

| | | | |
|---|---|---|---|
| JP | 2000174909 | A | 6/2000 |
| JP | 2001045495 | A | 2/2001 |
| JP | 2002290940 | A | 10/2002 |
| JP | 2002314972 | A | 10/2002 |
| KR | 20030017600 | A | 3/2003 |
| RU | 2240657 | C1 | 11/2004 |
| WO | 2004016037 | A | 2/2004 |

OTHER PUBLICATIONS

Russian Decision on Grant for RU2008105035/09(005476) issued Oct. 13, 2009.

Russian Office Action for RU2008105035/09(005476) issued Jun. 13, 2009.

* cited by examiner

F I G. 1
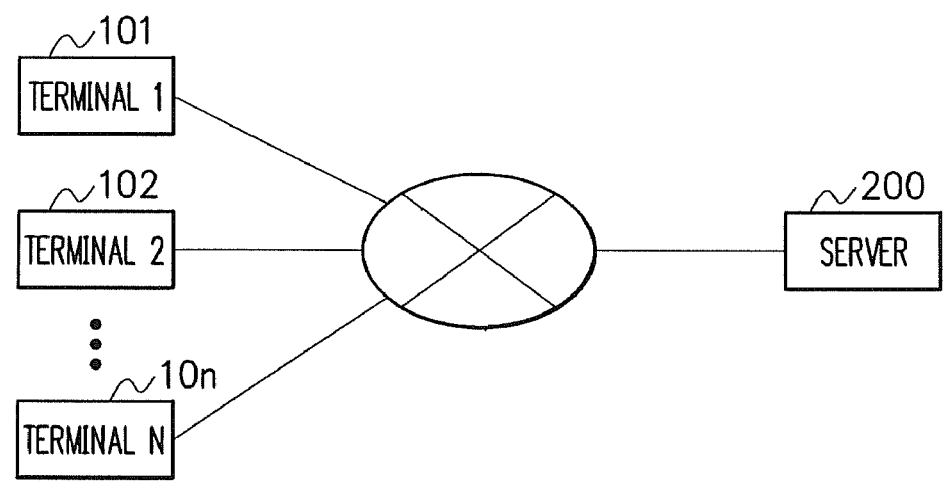
F I G. 2
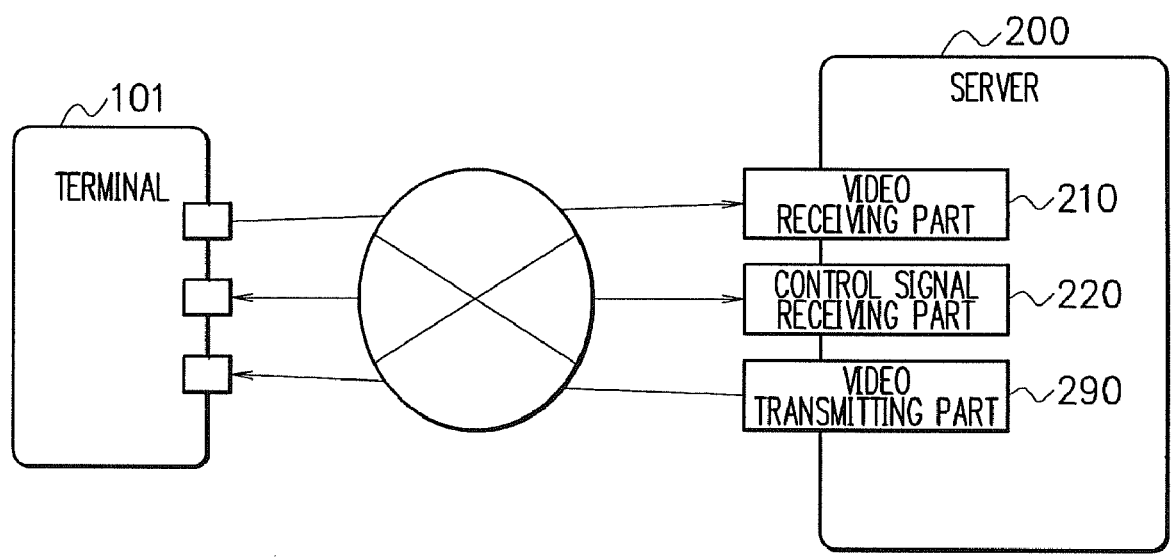

ly called a server) 200 via
MULTIPOINT CONFERENCE SYSTEM, MULTIPOINT CONFERENCE METHOD, AND PROGRAM

TECHNICAL FIELD

The present invention pertains to a multipoint conference system, a multipoint conference method, and a program, and in particular, to a so-called multipoint videoconference system that terminates a plurality of pieces of video data and transmits a video stream to a terminal, an apparatus using therefor, a program, and a multipoint videoconference method.

BACKGROUND ART

Japanese Patent Application Laid-Open No. 2002-290940 (Patent Document 1) introduces a video conference system in which a server, which is arranged in a network, temporarily receives a video stream transmitted from each terminal and then delivers the video stream to all terminals. In this mode, the server receives video data from all terminals respectively and delivers the video data to each terminal. Each terminal decodes a plurality of received video streams and displays them in a predetermined display format for video conferencing such as an equally divided screen composed display and a close-up of the speaker.

Also, a mode is known in which the server in the network decodes all video data received from each terminal, encodes the vide data after performing necessary image processing, and transmits only a video stream in response to a request from each terminal. According to this mode, the server can process video streams considering performance of the terminals and therefore, there is an advantage that the encoding method, encoding settings, options and the like can arbitrarily be set.

Patent Document 1: Japanese Patent Application Laid-Open No. 2002-290940

DISCLOSURE OF THE INVENTION

Problem to be Solved by the Invention

However, even in the latter mode in which a server in a network transmits only necessary video streams, there is a problem that all video streams must be prepared (decoded, for example) though only requested video streams are actually necessary. An increase in computational resources leads to restrictions of the number of channels processed by each server and thus is not desirable, and there is also a situation that decoding cannot be started from any point (place) even if a switching request is made because the video stream is compressed in a temporal direction.

Therefore, an object of the present invention is to provide a multipoint conference system, a multipoint conference method, and a program with low computational complexity that can swiftly respond to a switching request of video streams from terminals

Means for Solving the Problem

A first aspect according to the present invention provides a multipoint conference server connected to a plurality of terminals transmitting a video stream that encodes a video stream requested by each of the terminals before the video stream being transmitted to each of the terminals, wherein only video streams to be transmitted to each of the terminals are decoded, and other candidate video streams for switching are buffered and, when switching is requested, are decoded by going back in time. The multipoint conference server comprises decoders for decoding only video streams to be transmitted to each terminal, buffers for accumulating video streams not to be transmitted without decoding, and a switching control part that selects a video stream from video streams accumulated in the buffers in response to a switching request of video stream from the terminal, decodes the video stream by going back a predetermined time to the past, and switches the video stream to be transmitted to the terminal.

A second aspect according to the present invention provides a program to be executed by a computer constituting the multipoint conference server and a multipoint conference system that can be constituted by connecting the multipoint conference server and a group of terminals.

A third aspect according to the present invention provides a multipoint conference method performed using the multipoint conference server characterized by comprising (a) a decoding step, wherein the multipoint conference server decodes only a portion of video streams to be transmitted to each of the terminals; (b) an accumulating step, wherein the multipoint conference server accumulates video streams not to be transmitted in buffers without decoding them; and (c) a switching step, wherein, in accordance with a switching request of the video stream from the terminal, the multipoint conference server selects a video stream accumulated in the buffers, decodes the video stream by going back a predetermined time to a past, and switches the video stream to be transmitted to the terminal.

EFFECT OF THE INVENTION

According to the present invention, computational resources of a server used as a multipoint conference server can be controlled without losing response to switching requests from terminals. Since switching processing is performed taking into account compression of a video stream in the temporal direction, image quality will not be degraded.

BEST MODE FOR CARRYING OUT THE INVENTION

Next, the best mode for carrying out the present invention will be described in detail with reference to drawings. FIG. 1 is a diagram showing the outline configuration of a multipoint conference system according to an embodiment of the present invention. Reference to FIG. 1 shows a multipoint conference system connecting n (hereinafter, n denotes an integer equal to or greater than 2) terminals 101 to 10n and a multipoint conference server (hereinafter, simply called a server) 200 via a network 500.

FIG. 2 is a diagram showing a connection between each terminal and the server 200 in the multipoint conference system. A terminal 101 shown in FIG. 2 performs communication with each of a video receiving part 210, a control signal receiving part 220, and a video transmitting part 290 of the server 200 via the network 500 to perform transmission and reception of video streams along with transmission and reception of predetermined control signals.

FIG. 3 is a diagram showing a detailed configuration when n terminals are connected to the server 200 in the multipoint conference system. In addition to the control signal receiving part 220 and a control part 250, the server 200 can communicate with each of the terminals 101 to 10n by means of n video receiving parts 211 to 21n, n buffers 231 to 23n, n decoders 241 to 24n, n selection/composition parts 261 to 26n, n resize parts 271 to 27n, n encoders 281 to 28n, and n (video) transmitting part 291 to 29n in order to support n terminals.

The control signal receiving part 220 is a means for receiving a control signal from the terminals 101 to 10n to convey the control signal to the control part 250 and the control part 250 is a means, in addition to control of the whole server 200, for giving instructions to each unit including the decoders 241 to 24n after determining video streams to be delivered to each of the terminals 101 to 10n based on control signals.

The video receiving parts 211 to 21n are means for receiving packets including video streams from the terminals 101 to 10n via the network 500. The buffers 231 to 23n are temporary storage destinations of video streams stored in a memory of the server 200.

The decoders 241 to 24n are means for decoding video streams to create images and, as described later, have a flag indicating whether or not a video stream received from each terminal is currently to be decoded by means of active/inactive.

The selection/composition parts 261 to 26n are means for selecting an image output from the decoders 241 to 24n or a plurality of images for amalgamating them according to instructions from the control part 250. In addition, the resize parts 271 to 27n are means for scaling images output from the selection/composition parts 261 to 26n to the size fitting to each of the terminals 101 to 10n.

The encoders 281 to 28n are means for encoding images in accordance with the encoding method, encoding settings, and parameters fitting to each of the terminals 101 to 10n to convert such images into a video stream. The (video) transmitting parts 291 to 29n are means for transmitting a video stream created by the encoders 281 to 28n to each of the matched terminals 101 to 10n via the network 500.

Though not illustrated to facilitate understanding of the present invention, the multipoint conference server 200 is equipped with various processing means for manipulating voice streams.

Next, an overview of operations of the server 200 will be provided using FIG. 3. When each of the terminals 101 to 10n transmits a video stream as packets to the server 200, the video receiving parts 211 to 21n of the server 200 each receive and analyze individually packets from each terminal to extract video streams.

If it is assumed that all received streams are used (all received streams are to be transmitted to any of the terminals), the buffers 231 to 23n are not used and the streams are individually decoded by the decoders 241 to 24n to create one to n images.

Then, the selection/composition parts 261 to 26n select/compose images according to instructions of the control part 250 and the encoders 281 to 28n perform encode processing for each terminal. A video stream created by encoding is packetized before being individually transmitted to the terminals 101 to 10n by the (video) transmitting parts 291 to 29n.

Then, the terminals 101 to 10n can switch the video stream received from the server 200 by transmitting a control signal to the control signal receiving part 220 of the server 200 to convey a request to the server 200.

Operations when all received streams are not to be transmitted, in which an effect of the present invention will be plainly apparent, will be described below. The operation is the same as that of the aforementioned case until the video receiving parts 211 to 21n of the server 200 individually extract video streams after receiving and analyzing packets from each terminal.

Next, the flags of the decoders 241 to 24n are referenced. Here, if the flags of the decoders 241 to 24n are active (to be decoded), the video streams are decoded like the aforementioned case. If, on the other hand, the flags of the decoders 241 to 24n are inactive (not to be decoded), processing to temporarily store the video streams in the buffers 231 to 23n is performed.

FIG. 4 is a flow chart showing operations of the decoders 241 to 24n when an activation instruction is received from the control part 250 in an inactive (not to be decoded) state. After receiving the activation instruction, the decoders 241 to 24n check whether or not any video stream is stored in the buffers 231 to 23n (step S001).

Here, if any video stream is stored in the buffers 231 to 23n, the decoders 241 to 24n decode stored data (stream data) (step S003). As will be described later, an intra-frame (an intra-frame coded frame; hereafter referred to as an I-frame) is always stored in the buffers 231 to 23n, decoding will start from the I-frame.

A portion of data that has been decoded is deleted from the buffers and if data is still stored in the buffers 231 to 23n, the above steps S001 and S002 are repeated. In the meantime, the decoders 241 to 24n ignore time information and decode streams stored in the buffers 231 to 23n all at once. The latest image among a plurality of images generated by decoding is used by the selection/composition parts 261 to 26n.

If, on the other hand, the buffers 231 to 23n do not contain data any more (N in step S001), the decoders 241 to 24n make a transition to a decoding state in which the flag is set to active (to be decoded) (step S002).

FIG. 5 is a flow chart showing operations of the decoders 241 to 24n when an inactivation instruction is received from the control part 250 in an active (to be decoded) state. After receiving the inactivation instruction, instead of immediately stopping decoding, the decoders 241 to 24n decide behavior based on data receives by the video receiving part.

If the video stream of packets received in step S101 is not data of the I-frame (N step S102), the decoders 241 to 24n performs decoding like in the aforementioned active (to be decoded) state (step S103).

If, on the other hand, the video stream of received packets is data of the I-frame (Y step S102), the decoders 241 to 24n store the data in the buffers 231 to 23n without decoding the data (step S104).

Since the data size of the I-frame is large, it is sometimes divided into a plurality of packets. Thus, the decoders 241 to 24n check whether or not received data is the last data of the I-frame (step S105) and, if the stored data is not the last data of the I-frame, return to step S101 to receive divided subsequent data of the I-frame.

If, on the other hand, the received data is the last data of the I-frame (Y in step S101), the decoders 241 to 24n stop decode processing and makes a transition to a non-decoding state in which the flag is set to inactive (not to be decoded) (step S006).

The buffers 231 to 23n are controlled in this manner so that data is always stored beginning with the start of an I-frame and, when I-frame data should be newly stored, previous data is deleted.

FIG. 6 is a diagram for illustrating frame storage control in the buffers 231 to 23n realized by the aforementioned procedure. The terms 23x_T0 to 23x_T5 on the left side of FIG. 6 represent changes of the internal state of the same buffer 23x according to the flow of time (T0 to T5). The terms P_T0 to P_T4 on the right side of FIG. 6 represent video stream data arriving at each point in time. The term Ix (x is the arrival order) represents stream data of an I-frame and the term Px (x is the arrival order) represents stream data other than the I-frame.

The buffer is empty in the 23x_T0 state of FIG. 6 and then the data P_T0, which is not an I-frame, arrives. Since a control operation is performed to first store an I-frame in the buffers 231 to 23n, the data P_T0 is discarded in this case.

The buffer is empty in the 23x_T1 state of FIG. 6 like at the previous point in time and then, when the data P_T1, which is the I-frame, arrives, the data P_T1 is stored to enter the 23x_T2 state. When the data P_T2 further arrives in the 23x_T2 state of FIG. 6, the I-frame data P_T1 is already stored and thus the data P_T2 is subsequently stored to enter the 23x_T3 state. When the data P_T3 further arrives in the 23x_T3 state of FIG. 6, similarly the data P_T3 is subsequently stored to enter the 23x_T4 state of FIG. 6.

If, in the 23x_T4 state of FIG. 6, the data P_T4, which is a new I-frame, arrives, all previous data is discarded and the data P_T4 is stored as the first data to enter the 23x_T5 state.

As already described above, since the data size of the I-frame becomes large, it is sometimes divided into a plurality of packets. FIG. 7 is a diagram for illustrating frame storage control when an I-frame divided into a plurality of packets arrives. The terms 23x_T10 to 23x_T13 on the left side of FIG. 7 represent changes of the internal state of the same buffer 23x according to the flow of time (T10 to T13). The terms P_T10 to P_T12 on the right side of FIG. 7 represent video stream data arriving at each point in time. The term Ixy (x is the arrival order and y is the division number) represents stream data of an I-frame and Px represents data other than the I-frame.

The arriving data P1_T10 and P2_T10 in the 23x_T10 state of FIG. 7 is data (I2a, I2b) of the I-frame divided into two parts back and forth. First, the data P1_T10 in the first half is stored in the buffer and, in this stage, existing data is not discarded due to arrival of a new I-frame and the 23x_T11 state is entered. Then, when data P_T11 in the second half is further stored in the buffer in the 23x_T11 state of FIG. 7, all data prior to the new I-frame data (I2a, I2b) is discarded to enter the 23x_T12 state.

Then, in the 23x_T12 state of FIG. 7, as already described, when the non I-frame data P_T12 arrives, the data P_T12 is subsequently stored to enter the 23x_T13 state.

The operation after decoding by the decoders 241 to 24n is performed will be described again with reference to FIG. 3. Based on instructions from the control part 250, the selection/composition parts 261 to 26n acquire decoded images from the decoders 241 to 24n.

Next, in accordance with settings of the terminals 101 to 10n, the selection/composition parts 261 to 26n perform processing (composition processing) to compose a plurality of images horizontally and vertically. Further, if the size of an acquired or composed image and that of a video stream transmitted to the terminals 101 to 10n are different, the resize parts 271 to 27n perform scaling processing of the image based on instructions from the control part 250.

Next, the encoders 281 to 28n encode images fitting to bit rates and parameters of the transmission destination terminals 101 to 10n to convert images into a video stream.

Further, the (video) transmitting parts 291 to 29n packetize the converted video stream to transmit packets to the terminals 101 to 10n via the network 500.

According to the present embodiment, as described above, it is sufficient to decode m (1<m≦n) video streams, which is smaller than the number of terminals n, so that it becomes possible to control an increase in computational complexity on the server and to increase the number of channels that can be processed per machine. This is because a switching request of the video stream occurs only occasionally and thus, unnecessary decoding can be avoided.

Moreover, according to the present embodiment, while the multipoint conference system has the configuration capable of controlling an increase in computational complexity, it is possible to swiftly respond to a switching request of the video stream from the terminals. This is because unused stream data is stored in the buffers and held in a state so that the data stream can be decoded at any time. In addition, when the switching request arrives, decoding is started with an I-frame by going back in time, inhibiting degradation of image quality.

Next, a second embodiment in which the present invention is applied to a multipoint conference system based on an MPEG-4 stream will be described in more detail with reference to drawings. FIG. 8 is a diagram showing a detailed configuration of a server 300 of the multipoint conference system according to the second embodiment of the present invention.

Reference to FIG. 8 shows that the server 300 can communicate, in addition to a DTMF (Dual Tone Multi-Frequency) receiving part 320 and a control part 350, n RTP (Real Time transport Protocol) receiving parts 311 to 31n, n buffers 331 to 33n, n MPEG-4 decoders 341 to 34n, n selection/composition parts 361 to 36n, n resize parts 371 to 37n, n MPEG-4 encoders 381 to 38n, and n RTP transmitting parts 391 to 39n in order to support n terminals.

The DTMF receiving part 320 is a means corresponding to the control signal receiving part 220 in the first embodiment and a means for receiving a DTMF signal from each terminal and conveying the DTMF signal to the control part 350. The control part 350 is a means, in addition to control of the whole server 300, for determining MPEG-4 streams to be delivered to each terminal based on the DTMF signal and giving instructions to each unit including the MPEG-4 decoders 341 to 34n.

The RTP receiving parts 311 to 31n are means corresponding to the video receiving parts 211 to 21n in the first embodiment and means for receiving/analyzing RTP packets including MPEG-4 streams from terminals via the network 500 to extract the MPEG-4 streams. The buffers 331 to 33n are temporary storage destinations of video streams in a memory of the server 300.

The MPEG-4 decoders 341 to 34n are means corresponding to the decoders 241 to 24n in the first embodiment and means for decoding video streams to create images. Like the aforementioned first embodiment, the MPEG-4 decoders 341 to 34n have a flag indicating whether or not a video stream received from each terminal is currently to be decoded by means of active/inactive.

The selection/composition parts 361 to 36n are means for selecting, according to instructions from the control part 350, an image output from the MPEG-4 decoders 341 to 34n or a plurality of images from the MPEG-4 decoders 341 to 34n for composition into a state in which images are laid out vertically and horizontally. In addition, the resize parts 371 to 37n are means for scaling images output from the selection/composition parts 361 to 36n to the size fitting to each terminal.

The MPEG-4 encoders 381 to 38n are means corresponding to the encoders 281 to 28n in the first embodiment and are means for encoding images in accordance with the encoding method, encoding settings, and parameters fitting to each terminal to convert such images into an MPEG-4 stream.

The RTP transmitting parts 391 to 39n are means corresponding to the (video) transmitting part 291 to 29n in the first embodiment and are means for RTP-packetizing an MPEG-4 stream created by the MPEG-4 encoders 381 to 38n to transmit packets to each of the matched terminals 101 to 10n via the network 500.

Though not illustrated to facilitate understanding of the present invention, the multipoint conference server 300 is equipped with various processing means for manipulating voice streams.

Next, operations of the server 300 will be described with reference to FIG. 8. When each terminal transmits an MPEG-4 stream as RTP packets to the server 300, the RTP receiving parts 311 to 31n of the server 300 each receive and analyze individually packets from each terminal to extract MPEG-4 streams.

The MPEG-4 decoders 341 to 34n changes their operation depending on whether or not the held flag is active, as shown below. The MPEG-4 decoders 341 to 34n in the active state decode MPEG-4 streams to create images transmitted from each terminal.

If the flag is changed from active to inactive, instead of immediately stopping decoding, the MPEG-4 decoders 341 to 34n continue decode processing until an I-frame arrives and, after the I-frame arrives, rewrite the flag to make a transition to the non-decoding state.

After making a transition to the non-decoding state, the MPEG-4 decoders 341 to 34n store MPEG-4 stream data in the I-frame that has arrived in the buffers 331 to 33n. Like the aforementioned first embodiment, content of the buffers 331 to 33n is retained until a whole new I-frame arrives (If the I-frame is divided, the last data is awaited) and is cleared when the new I-frame arrives.

If the flag is changed from inactive to active, the MPEG-4 decoders 341 to 34n decode content by going back to the latest frame (I-frame) accumulated in the buffers.

On the other hand, after the selection/composition parts 361 to 36n select/compose images according to instructions of the control part 350 and the resize parts 371 to 37n performs scaling processing, the MPEG-4 encoders 381 to 38n perform encode processing for each terminal. An MPEG-4 stream created by encoding is RTP-packetized by the RTP transmitting parts 391 to 39n before being individually transmitted to the terminals.

The terminals can also switch the video received from the server 300 by transmitting a control signal as a DTMF signal to the DTMF receiving part 320 of the server 300 to convey a request to the server 300.

In the second embodiment described above, an example of using the DTMF signal as a control signal was described, but instead of the DTMF signal, SIP (Session Initiation Protocol) RTSP (Real Time Streaming Protocol) or the like may also be used.

Moreover, each of the above embodiments was described assuming that the server holds data after the latest I-frame in its buffer and, when a switching request is made, decodes from the start of the buffer (that is, the latest I-frame). However, the present invention can naturally be carried out in various modification and replacements without departing the spirit of the present invention, namely as far as video streams are stored in the buffer and, when a switching request is made, decoding is performed by going back a predetermined time to the past. For example, apart from the update logic of the buffer, read logic of the buffer (I-frame search) may naturally be provided.

BRIEF DESCRIPTION OF THE DRAWINGS

FIG. 1 is a diagram showing an outline configuration of a multipoint conference system according to an embodiment of the present invention.

FIG. 2 is a diagram showing a connection between each terminal and a server in the multipoint conference system according to an embodiment of the present invention.

Figure 3:
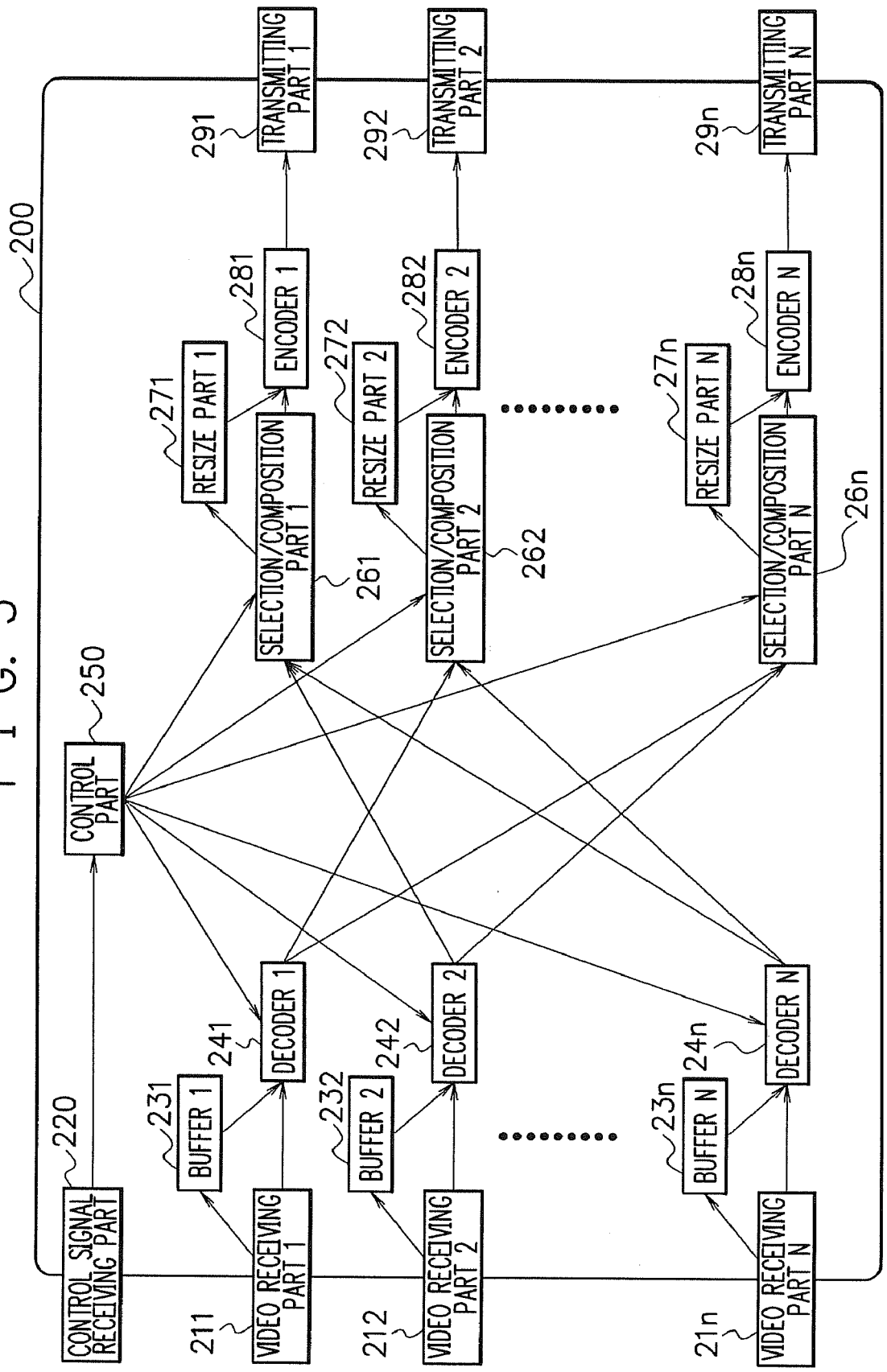
FIG. 3 is a diagram showing a detailed configuration of a multipoint conference server according to an embodiment of the present invention.
Figure 4:
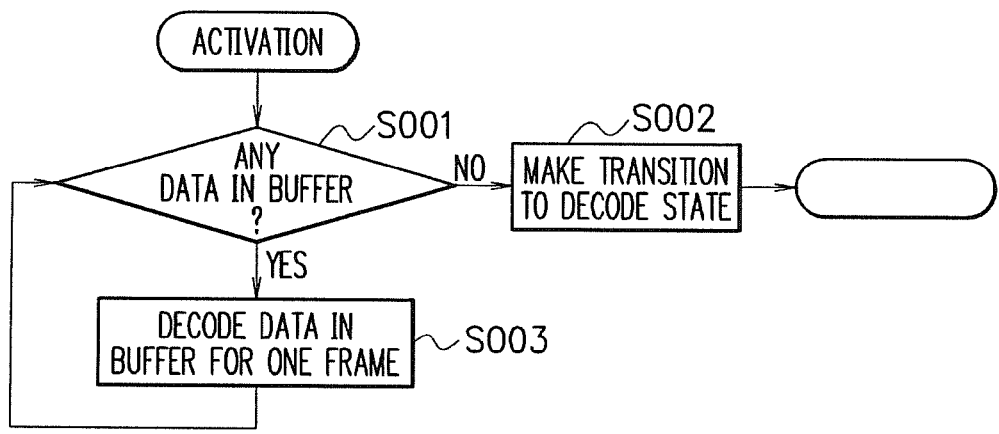
FIG. 4 is a diagram for illustrating operations of the multipoint conference server according to an embodiment of the present invention.
Figure 5:
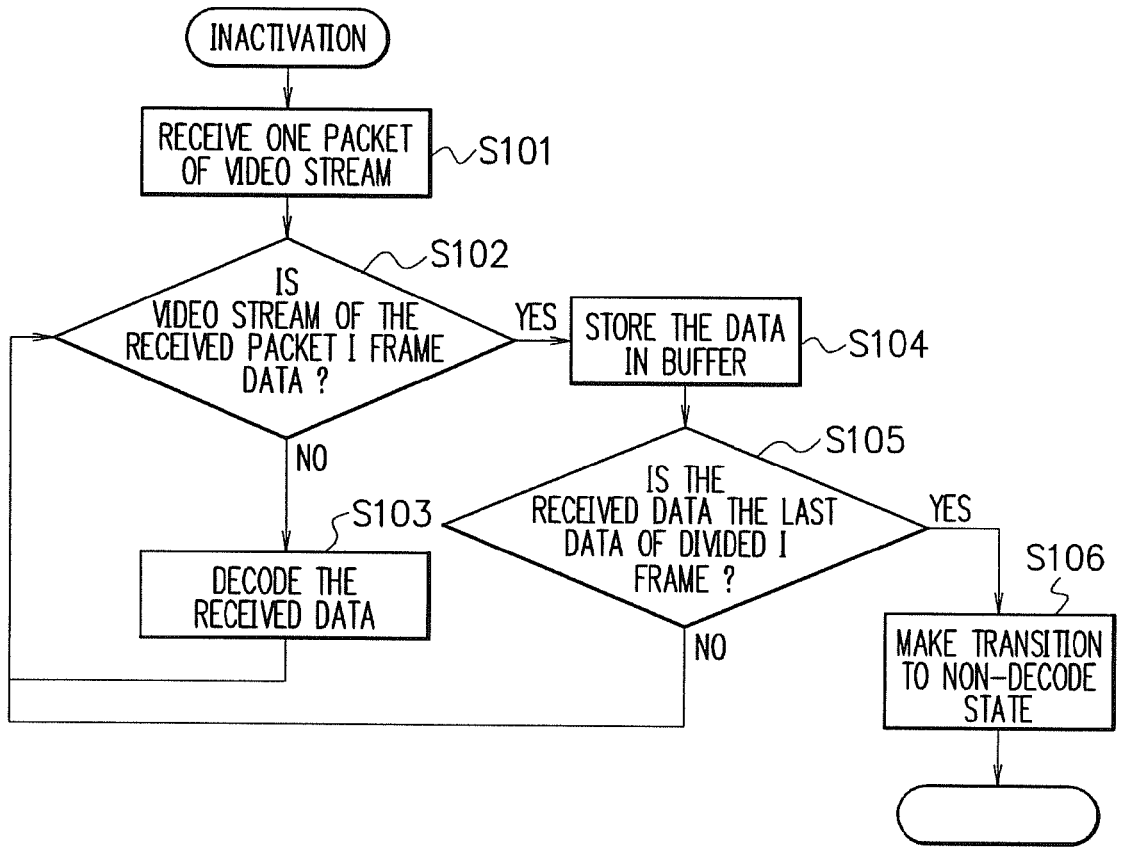
FIG. 5 is a diagram for illustrating operations of the multipoint conference server according to an embodiment of the present invention.
Figure 6:
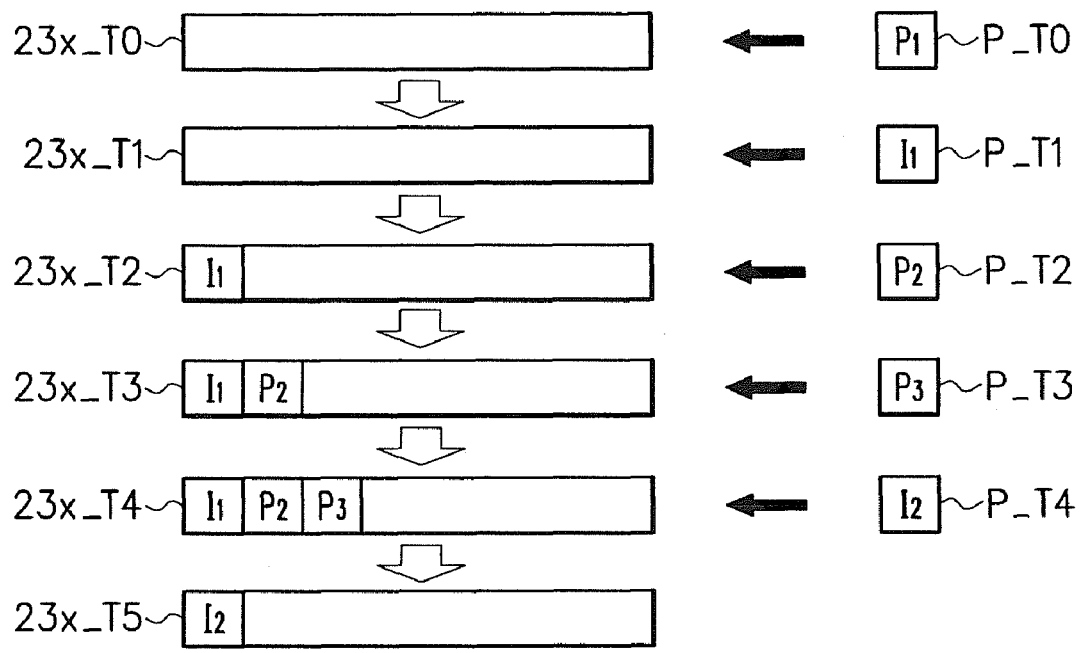
FIG. 6 is a diagram for illustrating buffer state transition of the multipoint conference server according to an embodiment of the present invention.
Figure 7:
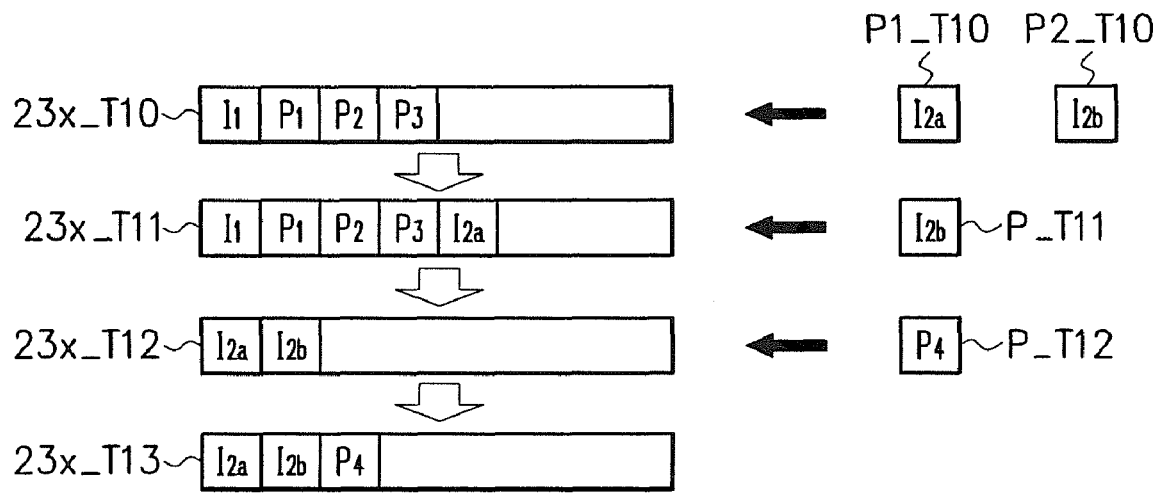
FIG. 7 is another diagram for illustrating buffer state transition of the multipoint conference server according to an embodiment of the present invention.
Figure 8:
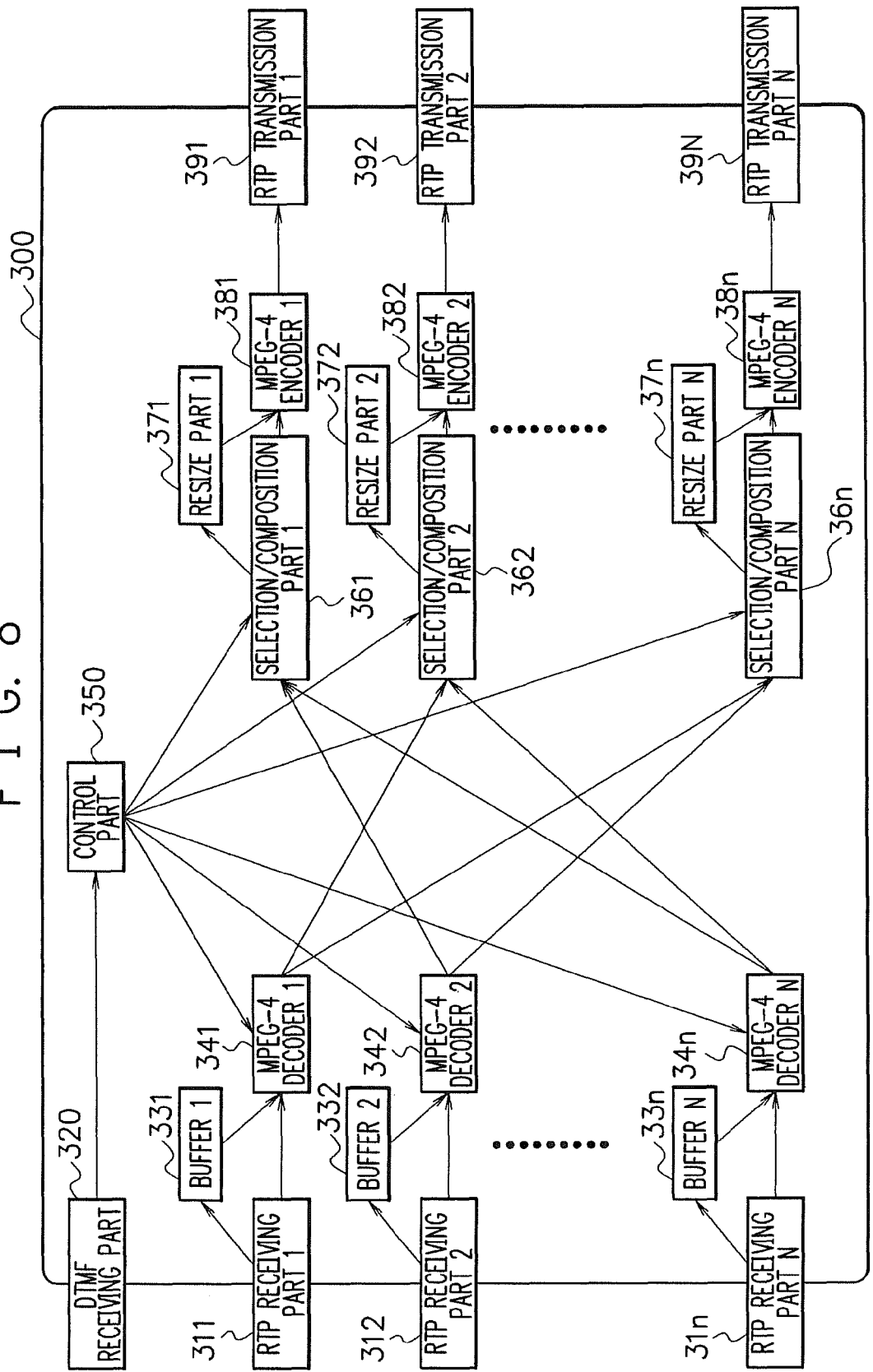
FIG. 8 is a diagram for illustrating operations of a multipoint conference server according to a second embodiment of the present invention.

EXPLANATION OF REFERENCE NUMERALS 101 to 10n: Terminal
200, 300: Multipoint conference server (Server)
500: Network
210, 211 to 21n: Video receiving part
220: Control signal receiving part
231 to 23n, 331 to 33n: Buffer
23x_T0 to 23x_T5, 23x_T10 to 23x_T13: Buffer
241 to 24n: Decoder
250, 350: Control part
261 to 26n, 361 to 36n: Selection/composition part
271 to 27n, 371 to 37n: Resize part
281 to 28n: Encoder
290, 291 to 29n: Video transmitting part (Transmitting part)
311 to 31n: RTP receiving part
320: DTMF receiving part
341 to 34n: MPEG-4 decoder
381 to 38n: MPEG-4 encoder
391 to 39n: RTP transmitting part
P_T0 to P_T4, P1_T10, P2_T10, P_T11, P_T_12: Video stream data

The invention claimed is:

1. A multipoint conference server connected to a plurality of terminals transmitting a video stream that encodes a video stream requested by each of the terminals before the video stream being transmitted to each of the terminals, comprising:
   decoders that decodes only a portion of video streams to be transmitted to each of the terminals;
   buffers that accumulates video streams not to be transmitted without decoding them; and
   a switching control part that, in accordance with a switching request of the video stream from the terminal, selects a video stream accumulated in the buffers, decodes the video stream by going back a predetermined time to a past, and switches the video stream to be transmitted to the terminal.

2. The multipoint conference server according to claim 1, wherein the switching control part performs decoding by going back to a latest intra-frame accumulated in the buffer.

3. The multipoint conference server according to claim 1, further comprising:
   a buffer update means for deleting content accumulated in the buffer each time an intra-frame is input.

4. The multipoint conference server according to claim 1, further comprising:
a selection/composition part for linking a plurality of video streams requested from the terminal to compose a video stream for transmission.

5. A multipoint conference system, comprising:
the multipoint conference server according to claim 1 and a plurality of terminals for exchanging video streams with the multipoint conference server, where the multipoint conference server and a plurality of the terminals are connected.

6. A non-transitory computer-readable medium storing a program for causing a computer, constituting a multipoint conference server that is connected to a plurality of terminals transmitting a video stream and encodes a video stream requested by each of the terminals before the video stream being transmitted to each of the terminals, to execute a process comprising:
decoding, among video streams received from each of the terminals, selecting a portion of video streams to be transmitted to each of the terminals,
accumulating video streams not to be transmitted to each of the terminals in buffers without decoding them, and
in accordance with a switching request of the video stream from the terminal, selecting a video stream accumulated in the buffers, decoding the video stream by going back a predetermined time to a past, and switching the video stream to be transmitted to the terminal.

7. The non-transitory computer-readable medium according to claim 6, wherein the process further comprises:
transmitting the video stream by going back to a latest intra-frame accumulated in the buffer for decoding in processing of switching the video stream to be transmitted to the terminal.

8. The non-transitory computer-readable medium according to claim 6, wherein the process further comprises deleting content accumulated in the buffer each time an intra-frame is input.

9. The non-transitory computer-readable medium according to claim 6, wherein the process further comprises linking a plurality of video streams requested from the terminal to compose a video stream for transmission.

10. A multipoint conference method performed by using a plurality of terminals transmitting a video stream and a multipoint conference server that encodes a video stream requested from each of the terminals before the video stream being transmitted to each of the terminals, comprising:
a decoding step, wherein the multipoint conference server decodes only a portion of video streams to be transmitted to each of the terminals;
an accumulating step, wherein the multipoint conference server accumulates video streams not to be transmitted in buffers without decoding them; and
a switching step, wherein, in accordance with a switching request of the video stream from the terminal, the multipoint conference server selects a video stream accumulated in the buffers, decodes the video stream by going back a predetermined time to a past, and switches the video stream to be transmitted to the terminal.

11. The multipoint conference method according to claim 10, wherein in the step of switching the video stream to be transmitted to the terminal, the multipoint conference server performs decoding by going back to a latest intra-frame accumulated in the buffer and transmits the video stream to the terminal.

12. The multipoint conference method according to claim 10, wherein the multipoint conference server further comprises a step of deleting content accumulated in the buffer each time an intra-frame is input.

13. The multipoint conference method according to claim 10, wherein the multipoint conference server further comprises a step of linking a plurality of video streams requested from the terminal to compose a video stream for transmission.

* * * * *